United States Patent [19]

Guimbal

[11] 3,777,190
[45] Dec. 4, 1973

[54] SUPERPOSED-STRIP FIELD WINDING FOR ROTARY ELECTRIC MACHINES

[76] Inventor: Jean C. Guimbal, 52, rue H. Dechaud, Saint-Etienne, France

[22] Filed: Sept. 22, 1971

[21] Appl. No.: 182,772

[30] Foreign Application Priority Data
Sept. 24, 1970 France .............................. 7035597

[52] U.S. Cl. .................................. 310/60, 310/192
[51] Int. Cl. ............................................. H02r 9/00
[58] Field of Search .................. 310/56, 53, 59, 55, 310/65, 61, 210, 214, 216, 217, 218, 269, 264, 194, 187, 188, 191

[56] References Cited
UNITED STATES PATENTS

| | | | |
|---|---|---|---|
| 1,114,405 | 10/1914 | Smooth .............................. | 310/218 |
| 2,818,515 | 12/1957 | Dolenc .............................. | 310/217 |
| 3,463,952 | 8/1969 | Norris .............................. | 310/269 |
| 3,333,131 | 7/1967 | Bush ................................. | 310/218 |
| 2,913,606 | 11/1959 | Guardiola ........................... | 310/65 |
| 1,882,487 | 10/1932 | DuPont ............................. | 310/217 |
| 1,253,242 | 1/1918 | Hiss ................................. | 310/194 |

FOREIGN PATENTS OR APPLICATIONS

| | | | |
|---|---|---|---|
| 78,960 | 11/1919 | Germany ............................ | 310/65 |
| 867,884 | 2/1953 | Germany ............................ | 310/218 |

Primary Examiner—R. Skudy
Attorney—Robert E. Burns

[57] ABSTRACT

Channels for the circulation of cooling fluid are provided in field windings for rotary electrical machines by superposing conducting strips having edge portions arranged to form the cooling channels. In one form,- the channels are formed by laterally offsetting alternate strips or groups of strips. In another form the channels are formed by alternate strips or groups of strips of different width. In still another form, edge portions of strips are of reduced thickness to provide the channels. Gaps between successive coils are kept uniform despite curvature of the rotor by varying the width of the strips.

7 Claims, 5 Drawing Figures

PATENTED DEC 4 1973 3,777,190

“3,777,190”

SUPERPOSED-STRIP FIELD WINDING FOR ROTARY ELECTRIC MACHINES

FIELD OF THE INVENTION

The present invention relates in general to rotary electric machines and has specific reference to a field winding of the superposed strip type therefor.

DESCRIPTION OF THE PRIOR ART

Rotary electric machines comprising a field winding consisting of stacked conducting strips retained by screwing on a magnetic circuit are already known. In machines of this character the conductors are cooled by causing a suitable gaseous stream to flow through slots formed between the conductors or in the conductors themselves. However, this arrangement is objectionable in that it is relatively complicated and expensive.

On the other hand, it is also known to hold the conductors by means of screws engaging tapped holes in the magnetic circuit but obviously this arrangement is not applicable to synchronous machines wherein the field member is carried by the rotor. Moreover, this arrangement is likewise objectionable in that it involves a great number of tapped holes to be formed in a rather expensive part, and that it does not permit a satisfactory thermal expansion of the conductors.

SUMMARY OF THE INVENTION

It is an object of the present invention to avoid these various inconveniences by providing an induction or field winding, the cooling of which is obtained in a remarkably simple manner due to a specific arrangement of the conducting strips, these strips being secured by resorting to likewise particularly simple means.

To this end, the field winding for rotary electric machines according to this invention comprises superposed conducting strips retained by screws or rivets and is characterized in that channels permitting the axial circulation of cooling gas are formed in the lateral faces of the windings consisting of said superposed strips.

Thus, the cooling gas will flow along the windings of which the heat transfer surface area is increased considerably, whereby the cooling efficiency of the assembly is greatly improved.

The channels formed in the lateral surfaces of the windings may be obtained in various ways. In a first procedure they can be formed by shifting alternatively to one side or the other, either groups of superposed conductors, or successive conductors, or finally, if it is desired to further increase the cooled surface areas, the successive superposed strips constituting the same conductor. This shifting is obtained by off-setting laterally to one or the other side the holes formed in the conducting strips for securing the same to the magnetic circuit.

According to a modified embodiment of the present invention, the aforesaid channels are obtained by providing alternate wide and narrow strips. This particular arrangement may prove advantageous notably when only one winding per pole is contemplated, for it permits the provision of channels on the side opposite to the pole, whereas on the pole side the strips may be clamped or tightened thereagainst and thus improve the coil strength.

According to a further modified embodiment, particularly advantageous when it is desired to impart great strength to the windings without unduly reducing the conductor thickness, the channels are obtained by thinning out the marginal portions of the conductors. This thinning out may be obtained by either reducing the strip thickness by milling the marginal portions of the conducting strips in planes parallel to the main faces thereof, or forming bevelled edges thereon.

The space available for the cooling air circulation may be increased without unduly elongating the channels, as this increment in length might impair the resistance of the field winding to the centrifugal force, and also with a view to reduce stress caused by this centrifugal force, the marginal portions of the conductors may be bevelled on the side thereof which is caused to project for constituting a cooling channel.

Due to the curvature of the space imparted to the coils if all the conductors were of same width, a gap would be obtained which would increase towards the outer periphery, so that the major portion of the cooling air output would tend to flow through this gap instead of flowing through the thin interstices of said channels. According to this invention, the coil width increases towards the outer periphery whereby the gap left between adjacent coils is just sufficient to ensure the necessary insulation. This increasing width may be obtained by either using strips of gradually increasing width, or increasing the lateral off-setting producing the aforesaid cooling channels.

In the specific case of a synchronous, very fast and powerful machine, the coils are secured to the rotor by means of holding or fastening screws extending through suitable blocks of dovetail or like configuration which are slipped into grooves of corresponding shape formed in the rotor drum. This fastening method is more economical and lends itself to the thermal expansion of the conductors between than the direct sweeping of the drum.

In the specific case of a synchronous machine having projecting poles, the coils driving these poles are fastened by screws of rivets to the polar horns and to the wings of the angle members clamping the side faces of these poles. Thus, these polar horns and wings assist in improving the strength of the assembly against the centrifugal force developed during the operation of the machine.

Finally, in the case of a direct-current machine, the field winding driving the main and auxiliary poles secured to the shell is also secured to this shell by means of screws and rivets.

BRIEF DESCRIPTION OF THE DRAWING

Various forms of embodiment of the invention will now be described by way of example with reference to the attached drawing, in which.

Figure 1:
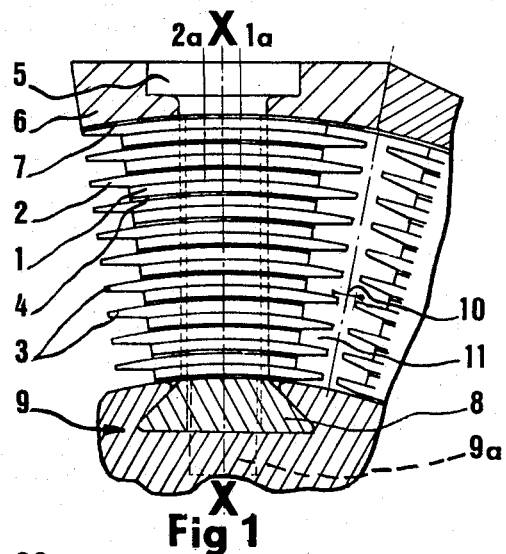
FIG. 1 is a fragmentary cross-sectional view of the rotor of a synchronous machine comprising an induction or field coil constructed according to the teachings of this invention.

DESCRIPTION OF THE PREFERRED EMBODIMENT:

The rotor field winding of a synchronous electrical machine which is illustrated in FIG. 1 comprises a plurality of conductors superposed radially and held between an external block 6 and the outer periphery of rotor 9. Each conductor comprises a lower strip 1 and an upper strip 2 both formed with plain holes permitting them to be secured to the magnetic circuit elements by means of radial screws 5. All of the upper strips 2 are off-set to the left and all the lower strips 1 are off-set to the right, as seen in the drawing, in relation to the coil axis X—X. To this end the axis X—X of the holes of the upper strips 2 are off-set to the right in relation to the axis 2a of the strips proper, and the holes of the lower strips 1 have their axis X—X off-set to the left in relation to the axis 1a of the strips proper. The alternate off-setting to the left and to the right of the upper and lower strips, respectively, is attended by the fact that the left-hand marginal portions 3 of the upper strips 2 project to the left in relation to the left-hand ends of the lower strips 1, and that similarly the right-hand marginal portions of the lower strips 1 project to the right in relation to the right-hand ends of the upper strips 2. Two adjacent strip edges will thus form together a notch or slot 11 constituting an axial cooling passage or channel.

Preferably, the marginal projecting portions 3 of said strips 1 and 2 are bevelled in order to increase the cross-sectional dimension of the channels through which cooling air is directed. With this arrangement the resistance to the centrifugal force is not impaired while reducing the stress due to this force.

Insulating blades or sheets 4 are disposed between the successive conductors. The radial fastening screws 5 extend through plain holes formed in the superposed conducting strips 1 and 2 so as to clamp the complete set of conductors by means of said blocks 6 and also of the uppermost conductor of the stack. These screws 5 engage tapped holes formed in dovetail-shaped inner blocks 8 inserted in peripheral grooves of corresponding configuration formed in the rotor drum 9. Between these grooves intended for holding the winding conductors in position other grooves (not shown in the drawing) are provided for holding the poles and in front of and behind these poles, the strips constituting the coil heads. Centrally of the coil the ends of some of said screws 5 project from the inner blocks 8 and are a close fit in corresponding blind holes 9a formed in rotor 9 in order to hold the coil centers in the axial direction while permitting the axial expansion of the coils in either direction.

The width of the conductors, i.e., strips 1 and 2, increases toward the outer periphery so that between the ends of the conductors of a pair of adjacent coils the gap denoted 10 remains at all points of the same order of magnitude as the widths of the slots or notches 11 formed by said marginal portions 3 of the conducting strips. To increase the cooling gas flow, the gas is supplied to both ends of the machine and flows into the passages formed by said notches and closed on the gap side by the blocks 6 in which the heads of the fastening screws 5 are sunk. Thus, the cooling gas escapes into the gap approximately in the middle of the machine, due to interstices provided at this location between the blocks 6.

Figure 2:
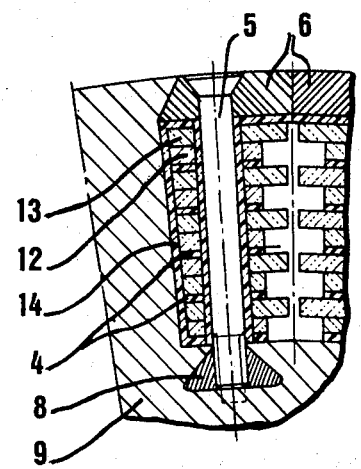
FIG. 2 is a fragmentary cross-sectional view illustrating a multiple-pole rotor wherein each pole carries a single coil or winding according to this invention.

FIG. 2 illustrates a modified form of embodiment of this invention, in the specific case of a coil structure of rotary electric machine comprising a relatively great number of rotor poles. In this machine comprising a single coil per pole this coil consists of superposed conductors consisting each, in turn, of a lower strip 12 and an upper strip 13. The lower strips 12 are narrower than the upper strips 13 so that the straight edges of the upper strips 13, which project from the straight ends of the lower strips 12, form therebetween notches constituting the necessary cooling passages or channels. These notches are disposed on the side opposite to the pole, and on the pole side the strips 12 and 13 may be clamped thereagainst with the interposition of an insulating element 14 in order to improve the coil strength. Also in this case the coil is assembled by means of radial screws 5 extending through aligned plain holes in the strips 12, 13 and having their heads sunk in the external blocks 6 and their screw-threaded shanks engaged in dovetail blocks 8 fitted in grooves of corresponding shape formed in the rotor 9. It will be seen that the holes in the lower strips 12 are located centrally of the strips while the holes in the upper strips 13 are offset laterally.

Figure 3:
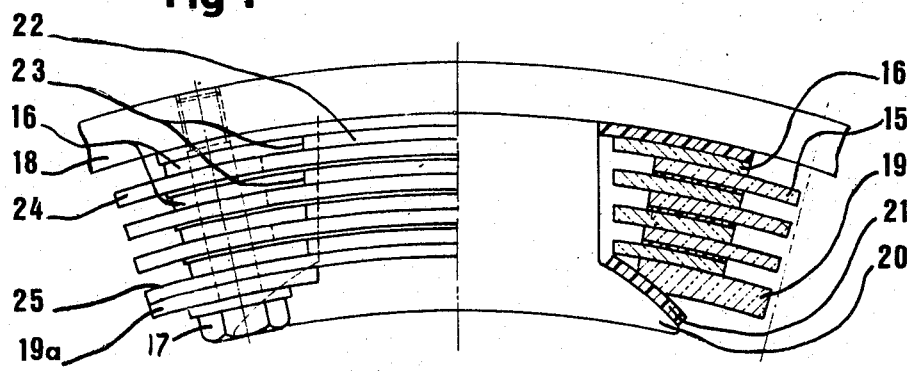
FIG. 3 is a part-elevational, part cross-sectional view of a field pole of a d.c. machine which carries a coil according to this invention.

FIG. 3 illustrates a further modified form of embodiment of a d.c. machine induction or field pole comprising a coil according to this invention which incorporates superposed conducting strips surrounding a projecting pole of the machine stator. Each conductor comprises a lower strip 15 off-set to the right and an upper strip 16 off-set to the left, as seen in the drawing. In this machine the presence of polar horns 20 projecting beyond the coil contour makes it possible to dispense with the use of screws disposed along the axial conductors. Therefore, in the form of embodiment illustrated in FIG. 3 the coil fastening screws 17 are disposed only at the corners of each coil and the necessary tightening action is obtained by engaging an external yoke 18. From one corner to the other the pressure is transmitted to the stacked conducting strips via lower strips 19 and 19a of the axial conductors nearest to the magnetic gap. For this reason, the strips 19, 19a are considerably thicker than the other strips of the stack. The strips 19, 19a nearest to the magnetic gap have their portions adjacent the polar horn 20 milled throughout the length thereof. An insulating blade or sheet 21 is provided for insulating the strip 19 from the polar horn 20 so that the latter plays a certain role in the tightening action.

The left-hand portion of FIG. 3 illustrates how the elements are assembled at the corners. Thus, the upper strips 22 of the coil heads are caused to abut at 23 against the straight edges of the upper axial strips 16, and the lower strips 24 of these coil heads extend the full width of the coil. It is the lower strip symmetrical to strip 15 visible in the right-hand portion of FIG. 3 that abut axially against the lower strip 24 of the coil head. The last lower strip 25 of the coil head engages a milled portion of the lower axial strip 19a symmetrical to strip 19.

Figure 4:
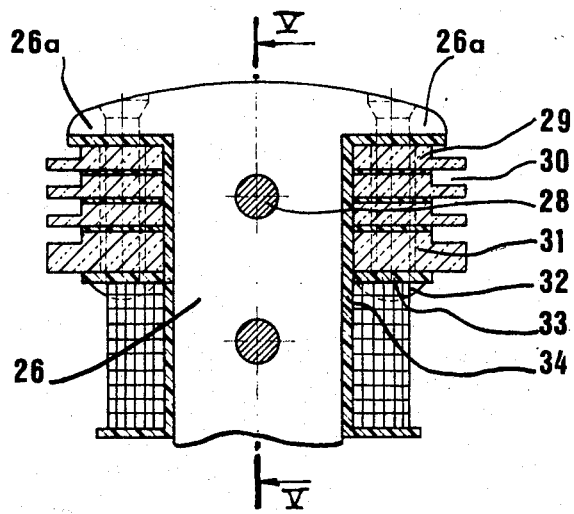
FIG. 4 is a cross-sectional view of the coiled field pole of a synchronous machine.
Figure 5:
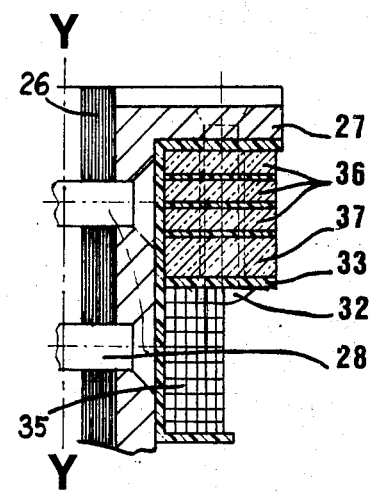
FIG. 5 is a fragmentary axial section taken along the line V—V of FIG. 4.

Reference will now be made to FIGS. 4 and 5 to illustrate a typical form of embodiment of this invention which is intended for a field coil pole of a synchronous rotary machine having a relatively large number of poles and also an adjustment winding. The poles proper consist each of a magnetic plate stacking 26 cut so as to form polar horns 26a. These plates 26 are clamped axially between the vertical wings of a pair of angle members 27 of non-magnetic metal, disposed symmetrically in relation to a transverse plane Y—Y, by means of rivets 28. The main field coil comprises the superposed axial conducting strips 29 having their external marginal portions milled to form cooling notches 30. The lower axial conductor 31 is thicker than the others and all the axial conducting strips are clamped against the polar horns 26a by means of corner rivets 32 insulated by an insulating strip 33. These rivets 32 secured to the horizontal wings of angle members 27 are also adapted to hold the coil-head forming portions of conducting strips 36 in position. The lower conducting strip 31 and the corresponding coil head 37 of greater thickness are intended for transmitting the clamping or tightening pressure given by the corner rivets 32. This arrangement is advantageous in that the poles assist in holding the coil against the centrifugal force. The corner joints between the axial conducting strips 29, 31 and the coil heads 36, 37 are formed partly by cutting the corresponding copper plates and partly by milling to mid-thickness. When assembling the component elements of the coil the strips are clamped between the poles with the interposition of insulated strips 34. Beforehand, the corners where the strip to strip connections are formed for constituting the coil "turns" are coated with a thin layer of fusible metal and when the coils are assembled completely, heat is applied to melt this metal and thus form a film of metal along the corner contact areas, thus welding all the connections into a distortion-free assembly. Beneath the coil assembly thus obtained an adjustment coil 35 may be fitted, if desired.

Although the present invention has been described and illustrated with reference to a few specific forms of embodiment, it will readily occur to those conversant with the art that various modifications and changes may be brought thereto without departing from the basic principles of the invention, as set forth in the appended claims.

We claim:

1. Field winding for rotary electric machines, secured to a magnetic circuit, comprising superposed conductive strips disposed extending axially of the winding, fastening members for securing said winding to said magnetic circuit said conductive strips being wider and narrower defining longitudinal channels formed in the side surfaces of the coils consisting of said conducting strips for circulating a cooling gas in the axial direction between said strips, and the marginal portions of the conductive strips are thinned out in order to form said channels therebetween.

2. In combination, a rotor for a rotary electrical machine having longitudinal grooves circumferentially spaced on the rotor, a plurality of field windings mounted on said rotor, each field winding comprising coils comprising superposed conductive strips extending longitudinally of said rotor, said conductive strips being alternately wider and narrower defining longitudinal channels along the side surfaces of the coils for circulating a cooling gas in an axial direction therein between the windings, means securing said windings on said rotor, and said means securing said windings on said rotor comprising an extenral magnetic shell clamping said strips on said rotor.

3. In combination, a rotor for a rotary electrical machine having longitudinal grooves circumferentially spaced on the rotor, a plurality of field windings mounted on said rotor, each field winding comprising coils comprising superposed conductive strips extending longitudinally of said rotor, said conductive strips being alternately wider and narrower defining longitudinal channels along the side surfaces of the coils for circulating a cooling gas in an axial direction therein between the windings, means securing said windings on said rotor, said means securing said windings on said rotor comprising for each winding a polepiece, and said polepiece having pole horns clamping the strips on the periphery of said rotor.

4. In combination, a rotor for a rotary electrical machine having longitudinal grooves circumferentially spaced on the rotor, a plurality of field windings mounted on said rotor, each field winding comprising coils comprising superposed conductive strips extending longitudinally of said rotor, said conductive strips being alternately wider and narrower defining longitudinal channels along the side surfaces of the coils for circulating a cooling gas in an axial direction therein between the windings, means securing said windings on said rotor, and said strips having side marginal portions narrowing in width toward the edges thereof.

5. Field winding for rotray electric machines, secured to a magnetic circuit, comprising superposed conductive strips disposed extending axially on the winding, fastening members for securing said winding to said magnetic circuit, said conductive strips being wider and narrower defining longitudinal channels formed in the side surfaces of the coils consisting of said conducting strips for circulating a cooling gas in the axial direction between said strips, and the marginal portions of said conductive strips which form said channels are bevelled.

6. Field winding for a rotary electric machine comprising means defining a magnetic circuit, coils in the winding comprising a plurality of superposed, conductive, flat strips of one equal dimension relative to a longitudinal axis of the winding, said strips being alternately offset in opposite directions relative to the longitudinal axis in the direction of said dimension, whereby said strips define air flow channels on opposite sides of said longitudinal axis offset in an axial direction one side of the axis relative to an opposite side of the axis.

7. Field winding according to claim 6, in which the flat strips are an offset equal amount on opposite directions relative to the longitudinal axis.

* * * * *